US 12,111,033 B2
(12) United States Patent
Lenický et al.

(10) Patent No.: US 12,111,033 B2
(45) Date of Patent: Oct. 8, 2024

(54) ILLUMINATION DEVICE FOR VEHICLE LAMP

(71) Applicant: ZKW Group GmbH, Wieselburg (AT)

(72) Inventors: Viktor Lenický, Gán (SK); Peter Ščibrányi, Tovarníky (SK)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/271,718

(22) PCT Filed: Jan. 10, 2022

(86) PCT No.: PCT/EP2022/050308
§ 371 (c)(1),
(2) Date: Jul. 11, 2023

(87) PCT Pub. No.: WO2022/167172
PCT Pub. Date: Aug. 11, 2022

(65) Prior Publication Data
US 2024/0210005 A1   Jun. 27, 2024

(30) Foreign Application Priority Data
Feb. 8, 2021 (EP) .................................... 21155734

(51) Int. Cl.
*F21S 43/239* (2018.01)
*F21S 43/15* (2018.01)
(Continued)

(52) U.S. Cl.
CPC ............. *F21S 43/239* (2018.01); *F21S 43/15* (2018.01); *F21S 43/26* (2018.01); *F21S 43/27* (2018.01);
(Continued)

(58) Field of Classification Search
CPC .......... F21S 43/239; F21S 43/27; F21S 43/15; F21S 43/26
See application file for complete search history.

(56) References Cited

U.S. PATENT DOCUMENTS 5,021,930 A   6/1991  Yamada
5,128,839 A   7/1992  Kato
(Continued)

FOREIGN PATENT DOCUMENTS

GB    1357546 A       6/1974
JP    H02160304 A     6/1990
(Continued)

OTHER PUBLICATIONS

Extended European Search Report Issued in EP Patent Application No. 21155734.3, dated Jul. 2, 2021 (34 Pages).
(Continued)

*Primary Examiner* — Matthew J. Peerce
(74) *Attorney, Agent, or Firm* — Eversheds Sutherland (US) LLP

(57) ABSTRACT

1. Illumination device (10) for a vehicle lamp, preferably a rear vehicle lamp, comprising: —a first light source (100) configured to emit light in a main direction (X) and contributes to a first light distribution, —a second light source (200) configured to emit light in the main direction (X) and contributes to a second light distribution, —a cover lens (300) with a translucent section (310), —a mounting body (20), on which the first and second light source (100, 200) are mounted, wherein the illumination device (10) comprises an additional lens device (400) comprising a first projection section (410) and a second projection section (420), which are at least partly translucent and are configured to project light of the first and second light source (100, 200) into the translucent section (310) of the cover lens (300), wherein the first projection section (410) in combi-
(Continued)

Figure 1:
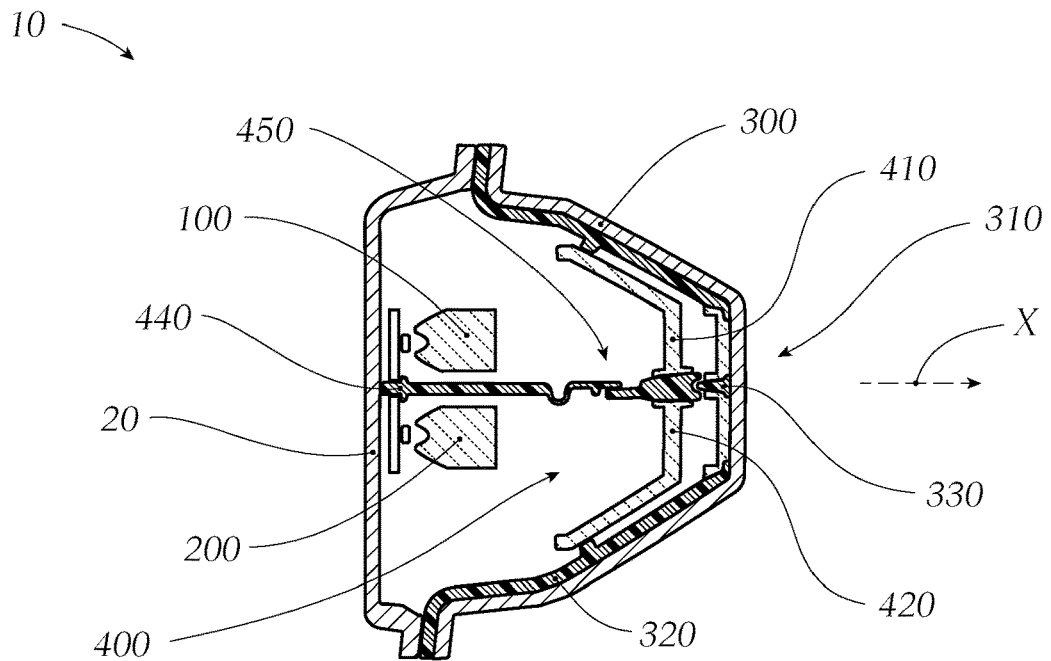

nation with the first light source (100) is configured to produce the first light distribution, and wherein the second projection section (420) in combination with the second light source (200) is configured to produce the second light distribution, wherein the additional lens device (400) comprises a first opaque section (430), which is arranged between the first and second projection section (410, 420) and is configured to separate both projection sections (410, 420) from each other, wherein the first opaque section (430) comprises an extension element (440), which is mechanically connected to the first opaque section (430) and extends from the first opaque section (430) towards and reaches between the first and second light source (100, 200), wherein the extension element (440) is arranged in a way to prevent light emitted from one of the light sources (100, 200) to couple into the other light source.

18 Claims, 3 Drawing Sheets

(51) Int. Cl.
*F21S 43/20* (2018.01)
*F21S 43/27* (2018.01)
*F21W 103/20* (2018.01)
*F21W 103/35* (2018.01)

(52) U.S. Cl.
CPC ..... *F21W 2103/20* (2018.01); *F21W 2103/35* (2018.01)

(56) References Cited

U.S. PATENT DOCUMENTS

| 2010/0195342 | A1* | 8/2010 | Lambert | G02B 6/0096 |
| | | | | 362/511 |
| 2016/0053960 | A1* | 2/2016 | Oguchi | B60Q 1/34 |
| | | | | 362/521 |
| 2018/0057091 | A1* | 3/2018 | Kuriki | B60Q 1/34 |
| 2020/0182428 | A1 | 6/2020 | Antonipieri et al. | |

FOREIGN PATENT DOCUMENTS

| JP | H1012020 A | 1/1998 |
| JP | 2020059445 A | 4/2020 |

OTHER PUBLICATIONS

International Search Report and Written Opinion Issued in International Application No. PCT/EP2022/050308, dated Mar. 25, 2022 (14 Pages).

* cited by examiner

ILLUMINATION DEVICE FOR VEHICLE LAMP

The invention relates to an illumination device for a vehicle lamp, preferably a vehicle rear lamp, comprising:
- a first light source configured to emit light in a main direction, wherein the first light source contributes to produce a first light distribution,
- a second light source configured to emit light in the main direction, wherein the second light source contributes to produce a second light distribution,
- a cover lens with a translucent section configured to project the light of the first and second light source in the main direction in front of the illumination device,
- a mounting body, on which the first and second light source are mounted, and wherein the cover lens is mountable on the mounting body in such a way, so that the mounting body and the cover lens build a closed casing for the first and second light source.

The invention also relates to a vehicle rear lamp comprising at least one aforementioned illumination device.

In typical rear lamps, the individual lighting functions (brake light and/or turn indicator) are realized either by separate reflectors or light guides. In case of light guides, shading elements are needed to prevent the radiation of one lighting function from influencing the other lighting function.

These shading elements are usually mounted in the lamp housing or the mounting body, however, in this way only rear lamps with narrow dimensions are possible.

It is an object of the invention to provide an enhanced illumination device.

To achieve this object, the illumination device comprises an additional lens device arranged in the closed casing and comprising a first projection section and a second projection section, which first and second projection section are at least partly translucent and are configured to project light of the first and second light source into the translucent section of the cover lens, wherein the first projection section of the additional lens device is assigned to the first light source and is in combination with the first light source configured to produce the first light distribution, and wherein the second projection section of the additional lens device is assigned to the second light source and is in combination with the second light source configured to produce the second light distribution, wherein the additional lens device comprises a first opaque section, which is arranged between the first and second projection section and is configured to separate both projection sections from each other, so that the light coupled into the first projection section of the additional lens device is prevented to couple into the other projection section, wherein the first opaque section of the additional lens device comprises an extension element, which is mechanically connected to the first opaque section by means of a mounting device and extends from the first opaque section towards and reaches between the first and second light source, wherein the extension element is arranged in a way to prevent light emitted from one of the light sources to couple into the other light source path and to prevent light emitted from one of the light sources to couple into a projection section assigned to the other light source.

There is a demand for production of rear or tail lamps provided with smaller out-coupling openings and/or projecting sections from a vehicle body. To fulfil homogeneity requirements the rear lamps must be designed longer. Thus, long rear lamps with small out-coupling openings or projection sections, having a large distance between the light sources and the cover lens are possible, since these are such size conditions are crucial for vehicle rear lamps.

Further, the extension element prevents light emitted from a light source to couple into the light path of the other light source.

Advantageously, the first and second light source are built as light guides, each of which extend along a longitudinal axis, wherein preferably the longitudinal axis of the light guides are parallel to each other.

Advantageously, in an installed position of the illumination device, the first and second light source being arranged in a vertical plane and parallel to each other along a horizontal axis, wherein the vertical plane is orthogonal to the main direction.

Advantageously, the mounting device is configured to allow an adjusting of the position of the extension element to the first opaque section of the additional lens device and a fixation in a final position.

Advantageously, the extension element is movable around an adjusting axis of the mounting device, which adjusting axis is orthogonal to the main direction.

Advantageously, the translucent section of the cover lens is surrounded by an opaque area of the cover lens.

Advantageously, the additional lens device is made by an injection molding process, wherein preferably the cover lens is made by a two-component injection molding process.

Advantageously, the additional lens device comprises at least one first engaging element and the cover lens comprises at least one second engaging element corresponding to the first engaging element, wherein in a mounted position of the additional lens device on the cover lens the first engaging element engages with the second engaging element so that the additional cover lens is mounted on the cover lens, wherein preferably the at least one first engaging element is arranged on the first and second projection section of the additional cover lens.

Advantageously, the first engaging element is built as a protrusion and the second engaging element is built as receiving opening, or the second engaging element is built as protrusion and the first engaging element is built as receiving opening.

Advantageously, the cover lens having a cavity, wherein the additional lens device is mountable into the cavity of the cover lens and fixed in a mounting position by pushing the additional lens device in the main direction so that the first engaging element of the additional lens device engages with the second engaging element of the cover lens.

Advantageously, the cover lens comprises a third and fourth projection section and a second opaque section which is arranged between the third and fourth projection section and is configured to separate both projection sections from each other, so that the light coupled into a projection section of the cover lens is prevented to couple into the other projection section, wherein the third projection section corresponds to the first projection section of the additional lens device and the fourth projection section corresponds to the second projection section of the additional lens device in a way, that light coupled into the first projection section is only projected into the third projection section of the cover lens, and that light coupled into the second projection section is only projected into the fourth projection section of the cover lens.

Advantageously, the at least one first engaging element of the additional lens device is further glued or welded to at least one second engaging element of the cover lens.

Advantageously, the first projection section having a color different from the second projection section of the additional lens device.

Advantageously, the extension element is glued or welded to the first opaque section of the additional lens device.

Advantageously, the first light distribution is a brake light distribution, wherein preferably the second light distribution is a turn indicator light distribution.

Advantageously, the extension element comprises a flexible and/or elastic mounting section, which mounting section is in mechanical contact with the first opaque section of the additional lens device, wherein preferably the mounting section touches the first opaque section and is fixed in this position, preferably by screws, welding or gluing.

The object of the invention is also achieved by a vehicle rear lamp comprising at least one illumination device according to the invention.

Figure 2:
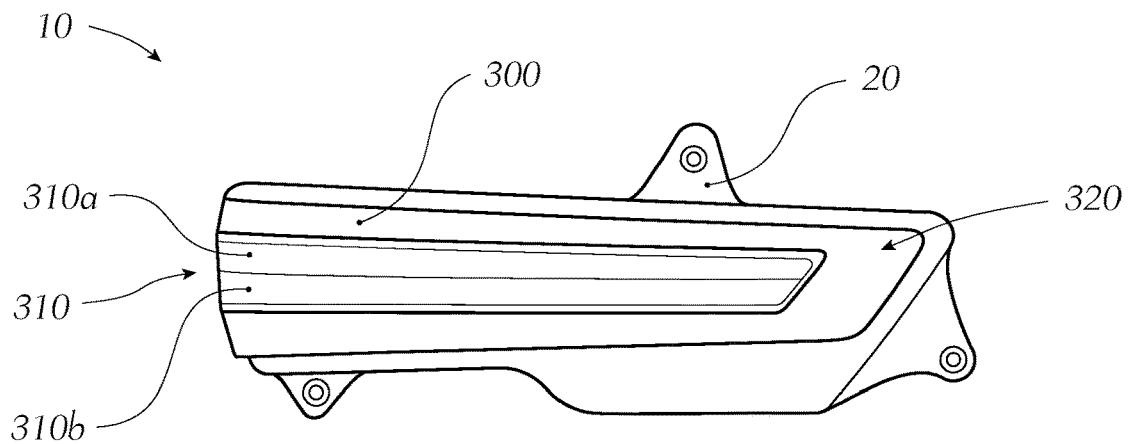
Figure 3:
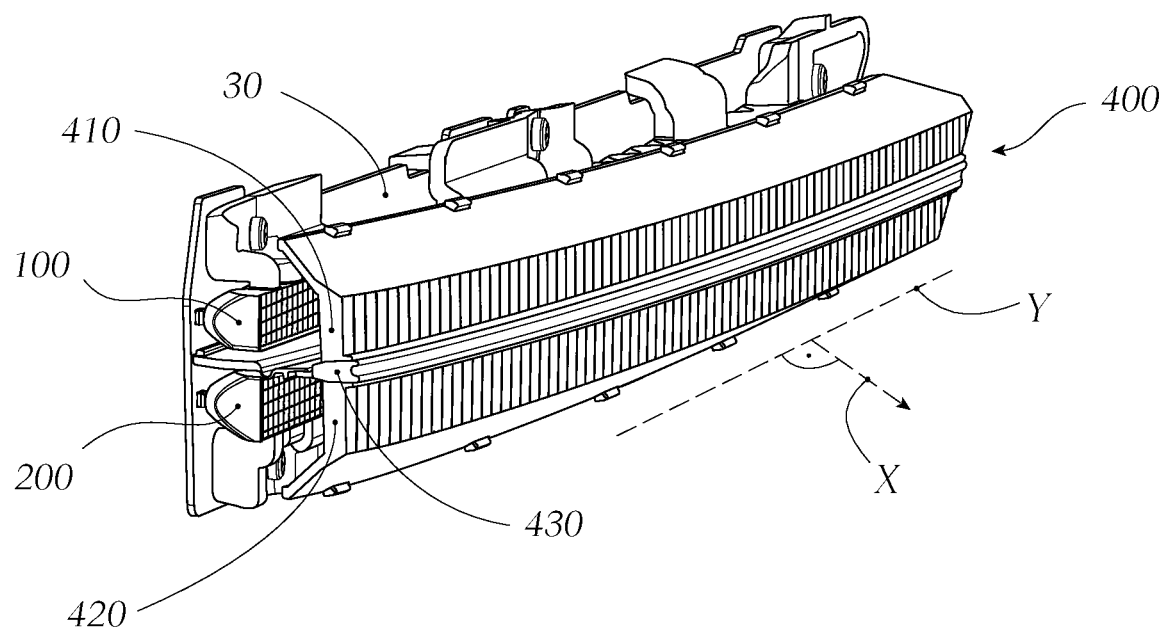
Figure 4:
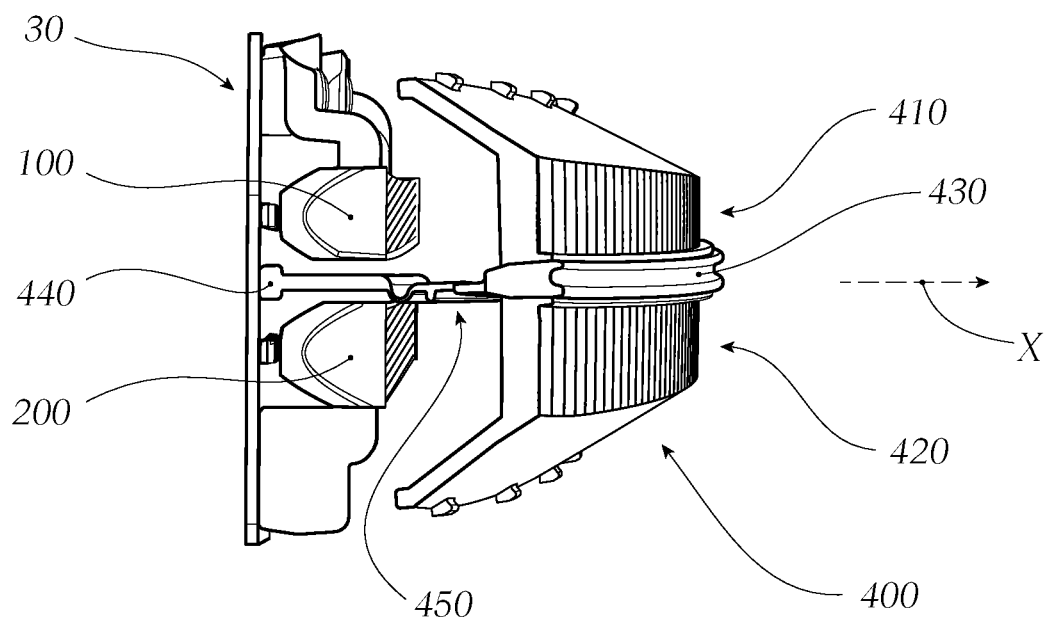
Figure 5:
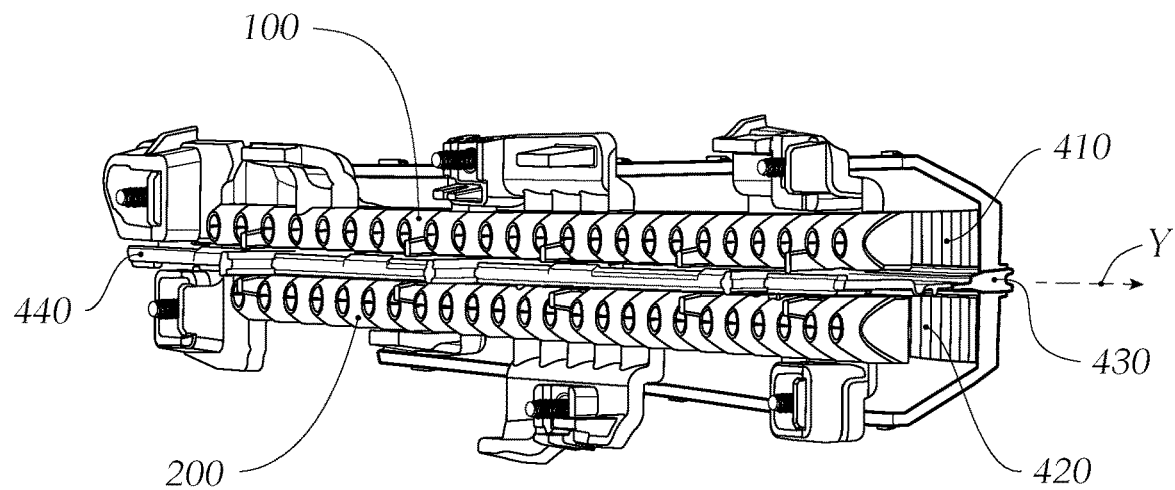
Figure 6:
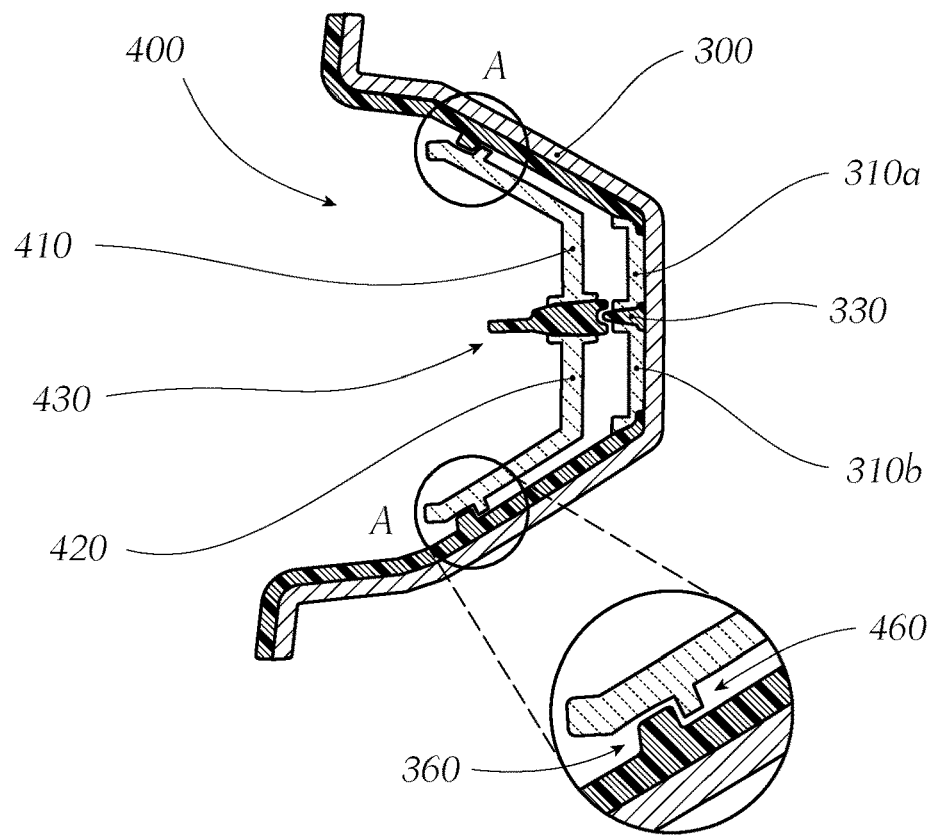

In the following, in order to further demonstrate the present invention, illustrative and non-restrictive embodiments are discussed, as shown in the drawings, which show:

FIG. 1 a cross-section of an example of an illumination device with a mounting body, on which a first and second light source is mounted, and a cover lens, which is mounted on the mounting body, wherein the illumination device comprises an additional lens device arranged in the closed casing, built by the mounting body and the cover lens, FIG. 2 a perspective view of the example of FIG. 1, FIG. 3 a perspective view of the components inside of the closed casing—the first and second light source and the additional lens device, FIG. 4 a side view of the components of FIG. 2, FIG. 5 a perspective back view of the components of FIG. 2 and FIG. 5, and FIG. 6 a detailed cross-section of the additional lens device mounted on the cover lens.

FIG. 1 shows an illumination device 10 for a vehicle rear lamp, comprising a first light source 100 configured to emit light in a main direction X, wherein the first light source 100 contributes to produce a first light distribution, a second light source 200 configured to emit light in the main direction X, wherein the second light source 200 contributes to produce a second light distribution, a cover lens 300 with a translucent section 310 configured to project the light of the first and second light source 100, 200 in the main direction X in front of the illumination device 10, wherein the translucent section 310 of the cover lens 300 is surrounded by an opaque area 320 of the cover lens 300. Preferably the cover lens 300 is made by a two-component injection molding process.

The illumination device 10 further comprises a mounting body 20, which forms a cavity, in which the first and second light source 100, 200 are mounted, and wherein the cover lens 300 is mountable on the mounting body 20 in such a way, so that the mounting body 20 and the cover lens 300 build a closed casing for the first and second light source 100, 200, which can be seen in FIG. 1 and FIG. 2, which shows a perspective view of the illumination device 10, wherein the cover lens 300 is mounted on the mounting body 20.

The first and second light source 100, 200 are built as light guides, each of which extend along a longitudinal axis, wherein preferably the longitudinal axis of the light guides are parallel to each other, and wherein the first and second light source 100, 200 are arranged or mounted on a common support body 30, preferably a printed circuit board. The common support body 30 is mountable in the mounting body 20.

Further, in an installed position of the illumination device 10, the first and second light source 100, 200 being arranged in a vertical plane and parallel to each other along a horizontal axis on the common support body 30, wherein the vertical plane is orthogonal to the main direction X.

The illumination device 10 further comprises an additional lens device 400, which is made by an injection molding process and arranged in the closed casing and comprising a first projection section 410 and a second projection section 420, which first and second projection section 410, 420 are at least partly translucent and are configured to project light of the first and second light source 100, 200 into the translucent section 310 of the cover lens 300, wherein the first projection section 410 of the additional lens device 400 is assigned to the first light source 100 and is in combination with the first light source 100 configured to produce the first light distribution, and wherein the second projection section 420 of the additional lens device 400 is assigned to the second light source 200 and is in combination with the second light source 200 configured to produce the second light distribution.

Further, the additional lens device 400 comprises a first opaque section 430, which is arranged between the first and second projection section 410, 420 and is configured to separate both projection sections 410, 420 from each other, so that the light coupled into a projection section 410, 420 of the additional lens device 400 is prevented to couple into the other projection section, which can be seen in detail in FIG. 3, FIG. 4 and FIG. 5.

The first opaque section 430 of the additional lens device 400 comprises an extension element 440, which is mechanically connected to the first opaque section 430 by means of a mounting device 450 and extends from the first opaque section 430 towards and reaches between the first and second light source 100, 200—as can be seen for example in FIG. 1—wherein the extension element 440 is arranged in a way to prevent light emitted from one of the light sources 100, 200 to couple into the other light source and to prevent light emitted from one of the light sources 100, 200 to couple into a projection section assigned to the other light source.

In this way, in an installed state of the illumination device 10, two chambers are built, each of the chambers comprises a light source and a projection section 410, 420; 310a, 310b of the additional lens device 400 and the cover lens 300, wherein light emitted by a light source 100, 200 of one chamber cannot couple or illuminate into the other chamber.

For installation, the extension element 440 is movable around an adjusting axis Y of the mounting device 450, which adjusting axis Y is orthogonal to the main direction X. The mounting device 450 is configured to allow an adjusting of the position of the extension element 440 to the first opaque section 430 of the additional lens device 400 and a fixation in a final position.

For installation of the additional lens device 400 onto or into the cover lens 300, the additional lens device 400 comprises at least one first engaging element 460 and the cover lens 300 comprises at least one second engaging element 360 corresponding to the first engaging element 460, wherein in a mounted position of the additional lens device 400 on the cover lens 300 the first engaging element 460 engages with the second engaging element 360 so that the additional lens device 400 is mounted on the cover lens 300, wherein preferably the at least one first engaging element 460 is arranged on the first and second projection section 410, 420 of the additional lens device 400, which can be seen in more detail in FIG. 6. The at least one first engaging element 460 of additional lens device 400 is further glued or welded to at least one second engaging element 360 of the cover lens 300.

In the shown example, the first engaging element 460 is built as a protrusion and the second engaging element 360 is built as receiving opening.

Further, the cover lens 300 having a cavity, wherein the additional lens device 400 is mountable into the cavity of the cover lens 300 and fixed in a mounting position by pushing the additional lens device 400 in the main direction X so that the first engaging element 460 of the additional lens device 400 engages with the second engaging element 360 of the cover lens 300.

The cover lens 300 further comprises a third and fourth projection section 310a, 310b and a second opaque section 330 which is arranged between the third and fourth projection section 310a, 310b and is configured to separate both projection sections 310a, 310b from each other, so that the light coupled into a projection section 310a, 310b of the cover lens 300 is prevented to couple into the other projection section, wherein the third projection section 310a corresponds to the first projection section 410 of the additional lens device 400 and the fourth projection section 310b corresponds to the second projection section 420 of the additional lens device 400 in a way, that light coupled into the first projection section 410 is only projected into the third projection section 310a of the cover lens 300, and that light coupled into the second projection section 420 is only projected into the fourth projection section 310b of the cover lens 300.

Further, in the shown example, the first projection section 410 of the additional lens device 400 having a color different from the second projection section 420 of the additional lens device 400, wherein the first light distribution is a brake light distribution and the second light distribution is a turn indicator light distribution.

Moreover, in the example of FIG. 4 the extension element 440 comprises a flexible and/or elastic mounting section, which mounting section is in mechanical contact with the first opaque section 430 of the additional lens device 400, wherein the mounting section touches the first opaque section 430 and is fixed in this position, preferably by screws, welding or gluing.

LIST OF REFERENCE SIGNS

Illumination device . . . 10
Mounting body . . . 20
Support body . . . 30
First light source . . . 100
Second light source . . . 200
Cover lens . . . 300
Translucent section . . . 310
Third projection section . . . 310a
Fourth projection section . . . 310b
Opaque area . . . 320
Second opaque section . . . 330
Second engaging element . . . 360
Additional lens device . . . 400
First projection section . . . 410
Second projection section . . . 420
First opaque section . . . 430
Extension element . . . 440
Mounting device . . . 450
First engaging element . . . 460
Main direction . . . x
Adjusting axis . . . Y

The invention claimed is:

1. An illumination device (10) for a vehicle lamp, comprising:
   a first light source (100) configured to emit light in a main direction (X), wherein the first light source (100) contributes to produce a first light distribution;
   a second light source (200) configured to emit light in the main direction (X), wherein the second light source (200) contributes to produce a second light distribution;
   a cover lens (300) with a translucent section (310) configured to project the light of the first and second light source (100, 200) in the main direction (X) in front of the illumination device (10); and
   a mounting body (20), on which the first and second light source (100, 200) are mounted, and wherein the cover lens (300) is mountable on the mounting body (20) in such a way, so that the mounting body (20) and the cover lens (300) build a closed casing for the first and second light source (100, 200),
   wherein the illumination device (10) comprises an additional lens device (400) arranged in the closed casing and comprising a first projection section (410) and a second projection section (420), which first and second projection section (410, 420) are at least partly translucent and are configured to project light of the first and second light source (100, 200) into the translucent section (310) of the cover lens (300), wherein the first projection section (410) of the additional lens device (400) is assigned to the first light source (100) and is in combination with the first light source (100) configured to produce the first light distribution, and wherein the second projection section (420) of the additional lens device (400) is assigned to the second light source (200) and is in combination with the second light source (200) configured to produce the second light distribution,
   wherein the additional lens device (400) comprises a first opaque section (430), which is arranged between the first and second projection section (410, 420) and is configured to separate both projection sections (410, 420) from each other, so that the light coupled into a projection section (410, 420) of the additional lens device (400) is prevented to couple into the other projection section,
   wherein the first opaque section (430) of the additional lens device (400) comprises an extension element (440), which is mechanically connected to the first opaque section (430) by means of a mounting device (450) and extends from the first opaque section (430) towards and reaches between the first and second light source (100, 200), wherein the extension element (440) is arranged in a way to prevent light emitted from one of the light sources (100, 200) to couple into the other light source and to prevent light emitted from one of the light sources (100, 200) to couple into a projection section (410, 420) assigned to the other light source,
   wherein the first and second light source (100, 200) are built as light guides, each of which extend along a longitudinal axis, and
   wherein the extension element (440) is movable around an adjusting axis (Y) of the mounting device (450), which adjusting axis (Y) is orthogonal to the main direction (X).

2. The illumination device according to claim 1, wherein in an installed position of the illumination device (10), the first and second light source (100, 200) are arranged in a vertical plane and parallel to each other along a horizontal axis, wherein the vertical plane is orthogonal to the main direction (X).

3. The illumination device according to claim 1, wherein the mounting device (450) is configured to allow an adjusting of the position of the extension element (440) to the first opaque section (430) of the additional lens device (400) and a fixation in a final position.

4. The illumination device according to claim 1, wherein the translucent section (310) of the cover lens (300) is surrounded by an opaque area (320) of the cover lens (300).

5. The illumination device according to claim 1, wherein the additional lens device (400) is made by an injection molding process.

6. The illumination device according to claim 1, wherein the additional lens device (400) comprises at least one first engaging element (460) and the cover lens (300) comprises at least one second engaging element (360) corresponding to the first engaging element (460), wherein in a mounted position of the additional lens device (400) on the cover lens (300) the first engaging element (460) engages with the second engaging element (360) so that the additional lens device (400) is mounted on the cover lens (300).

7. The illumination device according to claim 6, wherein the first engaging element (460) is built as a protrusion and the second engaging element (360) is built as receiving opening, or the second engaging element (360) is built as protrusion and the first engaging element (460) is built as receiving opening.

8. The illumination device according to claim 6, wherein the cover lens (300) having a cavity, wherein the additional lens device (400) is mountable into the cavity of the cover lens (300) and fixed in a mounting position by pushing the additional lens device (400) in the main direction (X) so that the first engaging element (460) of the additional lens device (400) engages with the second engaging element (360) of the cover lens (300).

9. The illumination device according to claim 1, wherein the cover lens (300) comprises a third and fourth projection section (310a, 310b) and a second opaque section (330) which is arranged between the third and fourth projection section (310a, 310b) and is configured to separate both projection sections (310a, 310b) from each other, so that the light coupled into a projection section (310a, 310b) of the cover lens (300) is prevented to couple into the other projection section, wherein the third projection section (310a) corresponds to the first projection section (410) of the additional lens device (400) and the fourth projection section (310b) corresponds to the second projection section (420) of the additional lens device (400) in a way, that light coupled into the first projection section (410) is only projected into the third projection section (310a) of the cover lens (300), and that light coupled into the second projection section (420) is only projected into the fourth projection section (310b) of the cover lens (300).

10. The illumination device according to claim 6, wherein the at least one first engaging element (460) of additional lens device (400) is further glued or welded to at least one second engaging element (360) of the cover lens (300).

11. The illumination device according to claim 1, wherein the first projection section (410) has a color different from the second projection section (420) of the additional lens device (400).

12. The illumination device according to claim 1, wherein the extension element (440) is glued or welded to the first opaque section (430) of the additional lens device (400).

13. The illumination device according to claim 1, wherein the first light distribution is a brake light distribution, wherein the second light distribution is a turn indicator light distribution.

14. The illumination device according to claim 1, wherein the extension element (440) comprises a flexible and/or elastic mounting section, which mounting section is in mechanical contact with the first opaque section (430) of the additional lens device (400), wherein the mounting section touches the first opaque section (430) and is fixed in this position, by screws, welding or gluing.

15. A vehicle rear lamp comprising at least one illumination device (10) according to claim 1.

16. The illumination device according to claim 1, wherein the longitudinal axes of the light guides are parallel to each other.

17. The illumination device according to claim 5, wherein the cover lens (300) is made by a two-component injection molding process.

18. The illumination device according to claim 6, wherein the at least one first engaging element (460) is arranged on the first and second projection section (410, 420) of the additional lens device (400).

* * * * *